(12) United States Patent
Chui et al.

(10) Patent No.: US 11,335,054 B2
(45) Date of Patent: May 17, 2022

(54) ADAPTIVE VIRTUAL CAMERA SENSOR

(71) Applicant: Outward, Inc., San Jose, CA (US)

(72) Inventors: Clarence Chui, Los Altos Hills, CA (US); Manu Parmar, Sunnyvale, CA (US)

(73) Assignee: Outward, Inc., San Jose, CA (US)

( * ) Notice: Subject to any disclaimer, the term of this patent is extended or adjusted under 35 U.S.C. 154(b) by 0 days.

(21) Appl. No.: 16/836,760

(22) Filed: Mar. 31, 2020

(65) Prior Publication Data
US 2020/0294302 A1  Sep. 17, 2020

Related U.S. Application Data

(63) Continuation of application No. 15/081,555, filed on Mar. 25, 2016, now Pat. No. 10,650,571.

(51) Int. Cl.
*G06T 15/06* (2011.01)
*G06T 5/00* (2006.01)

(52) U.S. Cl.
CPC ........... *G06T 15/06* (2013.01); *G06T 5/002* (2013.01)

(58) Field of Classification Search
CPC  G06T 15/06; G06T 5/002; G06T 7/40; G06T 2207/20182
See application file for complete search history.

(56) References Cited

U.S. PATENT DOCUMENTS

| | | | |
|---|---|---|---|
| 6,151,029 A * | 11/2000 | Shirman | G06T 15/04 345/428 |
| 9,741,159 B2 | 8/2017 | Hazel | |
| 9,842,424 B2 | 12/2017 | Hecht | |
| 9,865,078 B2 | 1/2018 | Lee | |
| 2002/0037113 A1 * | 3/2002 | Shin | G06T 7/42 382/254 |
| 2002/0094125 A1 | 7/2002 | Guo | |
| 2002/0109819 A1 | 8/2002 | Tuval | |
| 2003/0161007 A1 * | 8/2003 | Maurer | H04N 1/4095 358/3.26 |
| 2006/0139361 A1 | 6/2006 | Busch | |
| 2007/0139433 A1 | 6/2007 | Anderson | |
| 2008/0262353 A1 | 10/2008 | Tian | |
| 2012/0249742 A1 | 10/2012 | Abert | |
| 2012/0294543 A1 | 11/2012 | Sen | |
| 2013/0002671 A1 | 1/2013 | Armsden | |
| 2013/0170767 A1 | 7/2013 | Choudhury | |
| 2014/0029849 A1 * | 1/2014 | Sen | G06T 5/001 382/167 |
| 2015/0234151 A1 | 8/2015 | Venkataraman | |
| 2015/0348283 A1 | 12/2015 | Clarberg | |
| 2016/0098820 A1 * | 4/2016 | Rousselle | G06T 5/002 345/426 |

(Continued)

FOREIGN PATENT DOCUMENTS

| WO | 2015091518 | 6/2015 |
|---|---|---|
| WO | 2015104235 | 7/2015 |

*Primary Examiner* — Andrew G Yang
(74) *Attorney, Agent, or Firm* — Van Pelt, Yi & James LLP (57) ABSTRACT

Techniques associated with adaptive sampling are disclosed. In some embodiments, in response to receiving a specification of a scene to render, a sampling of each portion of the scene is determined based at least in part on the specification of the scene such that the scene is not uniformly sampled, and the scene is rendered according to the determined sampling of each portion of the scene.

54 Claims, 6 Drawing Sheets

(56) References Cited

U.S. PATENT DOCUMENTS

2016/0210778 A1\* 7/2016 Zimmer .................. G06T 5/002
2016/0314610 A1\* 10/2016 Lee ....................... G06T 15/005
2016/0350960 A1   12/2016 Yi
2016/0371857 A1\* 12/2016 Brothers .................. G06T 7/11

\* cited by examiner

ADAPTIVE VIRTUAL CAMERA SENSOR

CROSS REFERENCE TO OTHER APPLICATIONS

This application is a continuation of U.S. patent application Ser. No. 15/081,555, now U.S. Pat. No. 10,650,571, entitled ADAPTIVE VIRTUAL CAMERA SENSOR filed Mar. 25, 2016 which is incorporated herein by reference for all purposes.

BACKGROUND OF THE INVENTION

In physically based rendering techniques such as path-tracing, pixel values are computed by sampling rays cast from the pixels until converging values are achieved. Such indiscriminate sampling of pixels consumes processing resources and introduces latency that may be undesirable in many cases.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims, and the invention encompasses numerous alternatives, modifications, and equivalents. Numerous specific details are set forth in the following description in order to provide a thorough understanding of the invention. These details are provided for the purpose of example, and the invention may be practiced according to the claims without some or all of these specific details. For the purpose of clarity, technical material that is known in the technical fields related to the invention has not been described in detail so that the invention is not unnecessarily obscured.

In computer graphics, ray tracing is employed to render a three-dimensional scene with complex light interactions on a two-dimensional image plane. More specifically, ray tracing facilitates capturing a three-dimensional scene on an image sensor of a virtual camera viewing the scene from a particular position by tracing the paths of light rays and simulating their effects from encounters with objects comprising the scene. In order to only trace light rays that actually hit or intersect the image plane, ray tracing mathematically identifies and reproduces the path that each light ray follows in the reverse direction by tracing a path from a virtual camera position through each pixel of the image plane to its interactions with objects of the scene, including reflection, refraction, and/or shadow effects, to eventually its point of origin, i.e., a light source in the scene. Based on the determined path of each light ray and its interaction with scene objects, a corresponding pixel value (i.e., pixel color) is determined. In many cases, a plurality of samples of light rays is cast from pixels of the image plane into the scene to obtain more accurate pixel values. The path of a light ray is not deterministic but has constrained randomness. More samples of light rays through a pixel facilitate identifying a converging value for that pixel in a distribution of possible outcomes.

Various techniques associated with adaptive sampling are disclosed. Intelligently selecting the numbers of samples of light rays in ray tracing based on foreknowledge of an associated scene facilitates substantially reducing the total number of samples used and hence render time of the scene. As further described herein, a scene that is desired to be rendered is not uniformly sampled during ray tracing. Rather, different portions of a scene under consideration are sampled differently based on existing information known about the scene and parts thereof. Moreover, in many cases, it is not necessary to sample until pixel convergence is achieved. Reducing the numbers of samples used according to the disclosed techniques substantially reduces processing resources consumed and latency during ray tracing. Generally, the disclosed adaptive sampling techniques result in a virtual camera having a custom image sensor that is adaptively selected and optimized based on the scene being rendered.

The given description generally describes ray tracing. However, the disclosed techniques may equivalently be employed with path tracing or any other ray based rendering technique that relies on tracing paths of light.

Figure 1A:
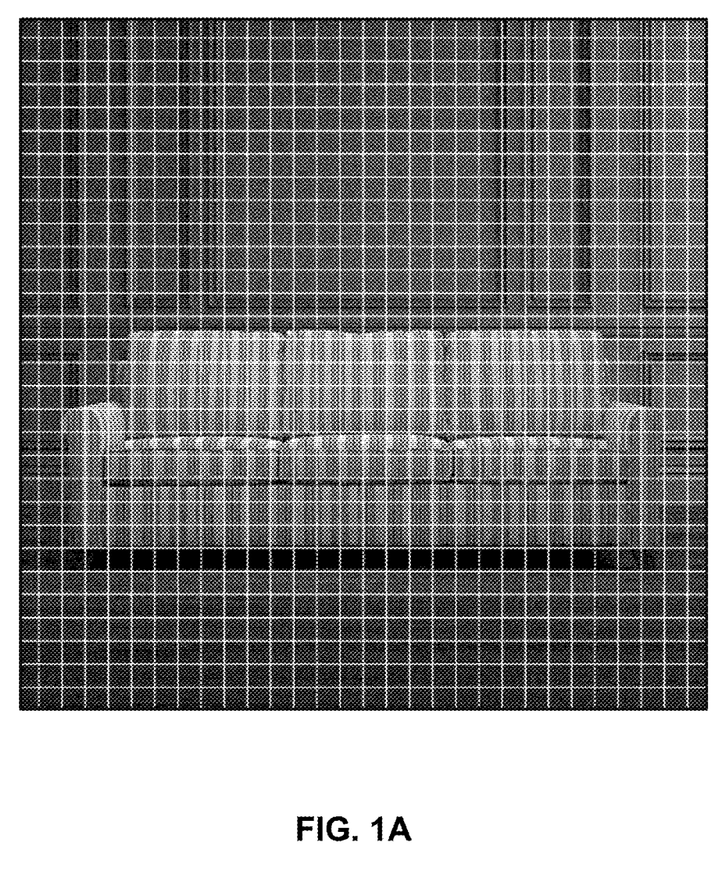
FIG. 1A illustrates an embodiment of an image sensor of a virtual camera configured to render a scene.

FIG. 1A illustrates an embodiment of an image sensor of a virtual camera configured to render a scene. The image of the scene in the given figure comprises the scene seen at the image plane of the sensor from the associated virtual camera position. In this example, the sensor array divides the image plane into a grid of equally sized portions having the same area. In the embodiment of FIG. 1A, a number of samples of light rays from each pixel or grid element is selected based on the part of the scene seen by each area of the sensor and foreknowledge thereof. Thus, the pixels of the image plane of the sensor each comprise the same area but an adaptively selected number of samples of light rays for ray tracing.

Figure 1B:
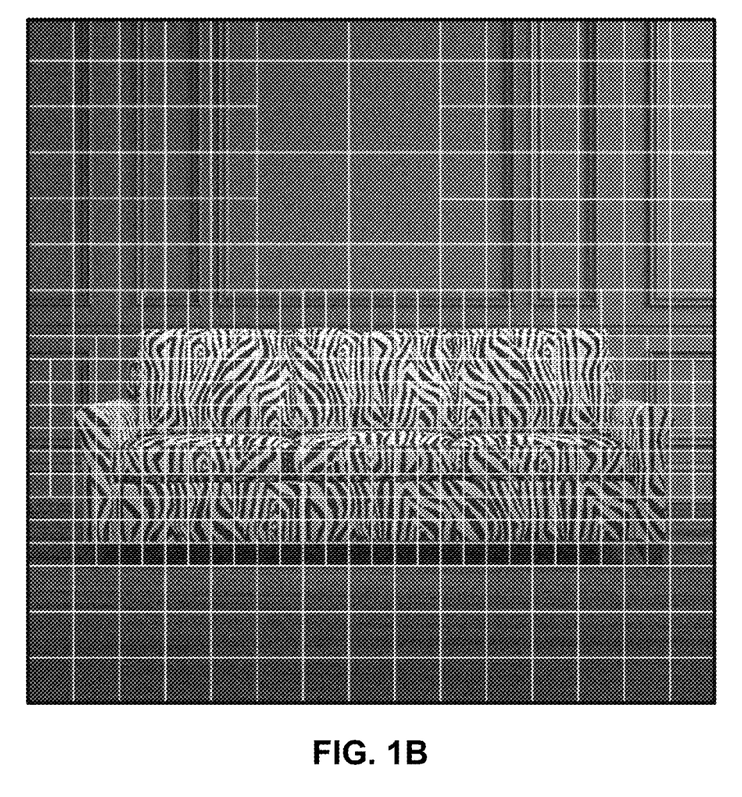
FIG. 1B illustrates an embodiment of an image sensor of a virtual camera configured to render a scene.

FIG. 1B illustrates an embodiment of an image sensor of a virtual camera configured to render a scene. The image of the scene in the given figure comprises the scene seen at the image plane of the sensor from the associated virtual camera position. In this example, the sensor array divides the image plane into a grid that does not have equally sized portions. Rather, the image plane is divided into grid elements having areas based on the nature of the scene. In the embodiment of FIG. 1B, each pixel or grid element is sampled equally during ray tracing. Thus, the pixels of the image plane of the sensor each comprise an adaptively selected area size but the same number of samples of light rays for ray tracing.

The sensor array configurations of FIG. 1A and FIG. 1B are effectively equivalent ways of representing adaptive sampling and may be used interchangeably. In the embodiment of FIG. 1A, pixels comprise the same area but different numbers of samples. In the embodiment of FIG. 1B, pixels comprise different areas but the same number of samples. Thus, depending on the context, adaptive sampling may refer to numbers of rays or spatial areas. Conceptually, the sensor array configuration of FIG. 1B is better suited for describing adaptive sampling of a scene since it is generally easier to designate areas that should be equally sampled based on foreknowledge of the scene.

As previously mentioned, adaptive sampling relies on foreknowledge of a scene, such as on information about the scene content, geometry, lighting, environment, texture, etc. Portions of the scene that are known to be of particular interest or importance and/or are more complex are generally sampled more than other less important or complex portions of the scene. In such cases, complexity may at least in part be defined as an expected number of samples required to achieve convergence during ray tracing and may depend on how rapidly a corresponding portion of the scene varies. As can be seen in the example depicted in FIG. 1B, the sofa is sampled more heavily than other portions of the scene, such as the floor and the wall. More specifically, the smallest areas are selected for pixels corresponding to rapidly spatially varying portions of the sofa while the largest areas are selected for pixels corresponding to the smoothest portions of the background wall.

Figure 2:
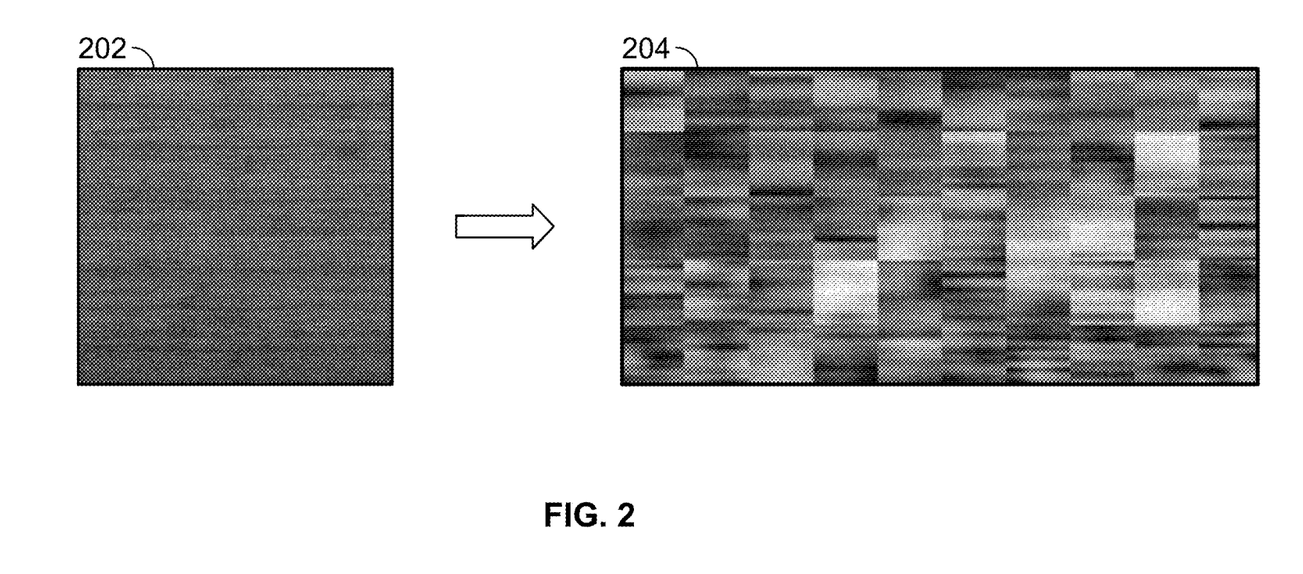
FIG. 2 illustrates an embodiment of generating a texture definition.

In addition to foreknowledge of the scene, foreknowledge of the ability to denoise various portions of a ray traced rendering may at least in part dictate the sampling of those portions of the scene during ray tracing. In some embodiments, one or more libraries or dictionaries having texture definitions are maintained and employed for denoising post ray tracing. In some cases, separate dictionaries are maintained for different types or classes of objects and/or associated textures, e.g., so that the correct ones may be easily identified and selected during denoising. Alternatively, a master dictionary may be indexed so that relevant subsets may be easily identified and selected during denoising. Each texture definition may comprise a collection of small images associated with that texture, any subset of which may be employed to generate or denoise an occurrence (e.g., one or more pixels or an area) of that texture in an image. FIG. 2 illustrates an embodiment of generating a texture definition. As depicted, an input image of a hardwood floor 202 is deconstructed into a collection of fifty small images 204. An appropriately weighted combination of one or more of the collection of images 204 may be employed to generate or reconstruct hardwood floor textures. Given that input image 202 comprises a high definition or resolution image, a combination of a prescribed number of the collection of images 204 will also have the same resolution and can be used to denoise this texture in a rendered image. Thus, in many cases, portions of a scene comprising complex textures or patterns need not be aggressively sampled during ray tracing since these portions can be easily denoised as a post processing step subsequent to ray tracing using corresponding texture dictionaries or libraries.

Figure 3:
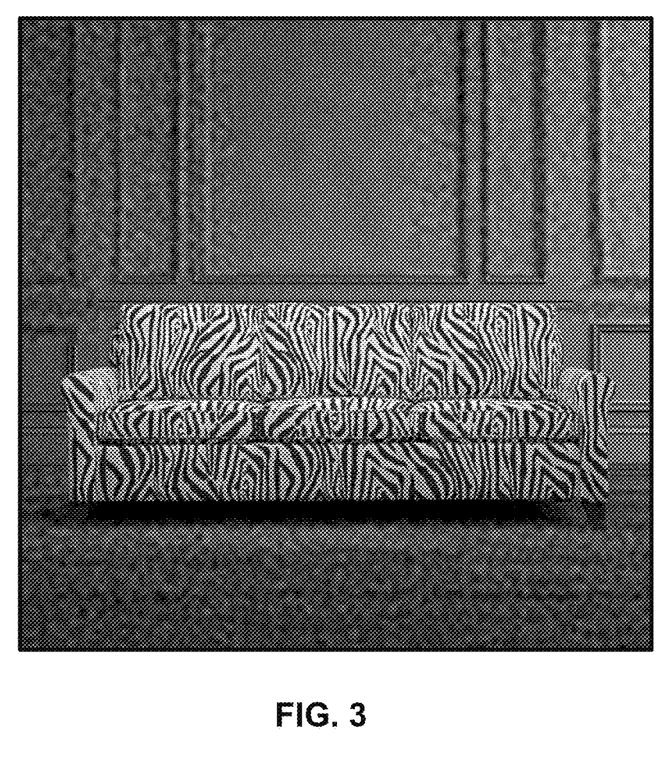
FIG. 3 illustrates an embodiment of a rendering of a scene, i.e., an output of ray tracing the scene.

FIG. 3 illustrates an embodiment of a rendering of a scene, i.e., an output of ray tracing the scene. Specifically, FIG. 3 comprises a ray traced rendering of the scene that has been adaptively sampled according to the sensor configuration of FIG. 1B. As depicted, areas of the scene that have been sampled more are rendered in higher quality compared to areas of the scene that have been sampled less. That is, the sofa is rendered with higher quality since it was sampled more, and the floor and the wall are rendered with lower quality since they were sampled less. As can be seen by the resulting artifacts and large pixelation, the floor and the wall are particularly and, in many cases, unacceptably noisy, with much of their texture information lost. To correct this, the ray traced rendering, and especially each of the low quality portions, is subsequently subjected to post processing denoising techniques.

Figure 4:
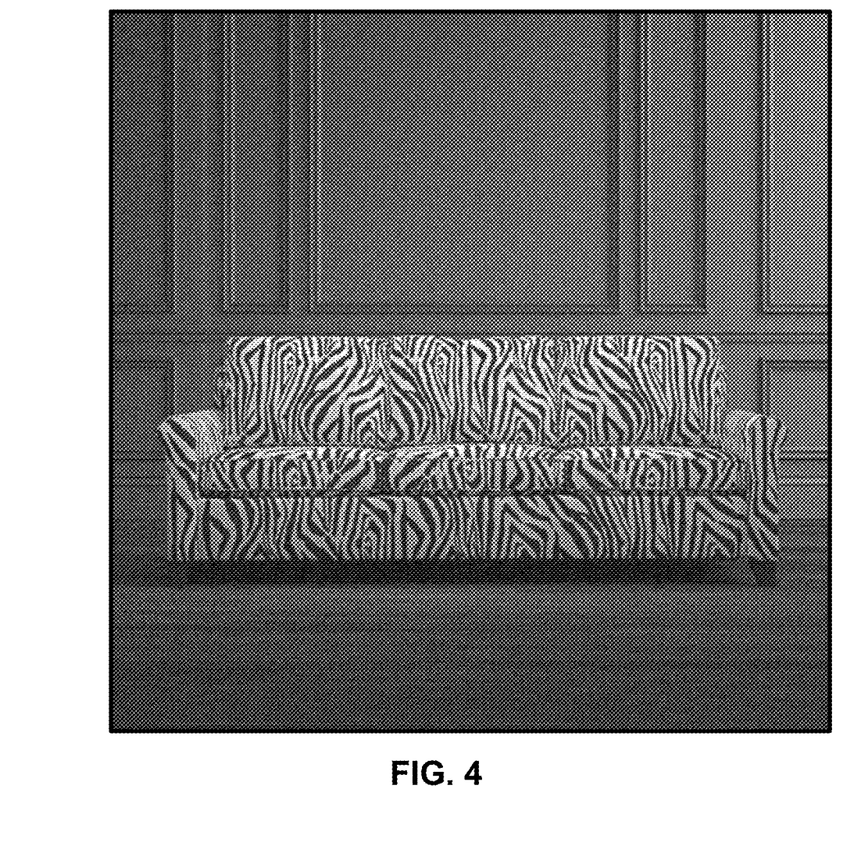
FIG. 4 illustrates an embodiment of the rendered scene after denoising.

Denoising is based on knowledge of the known composition of the rendered scene. For example, given foreknowledge that the scene comprises a hardwood floor, a dictionary of textures or a subset thereof (e.g., a subset comprising floor textures or more specifically hardwood floor textures) is retrieved and employed to denoise the floor pixels or areas of the ray traced rendering. The wall portion of the scene is similarly denoised. Despite the sofa being sampled relatively more than other portions of the scene, extra sampling for the purpose of capturing the intricacies of the complex zebra print or pattern is not necessary since this texture can also be similarly denoised. Thus, generally, less sampling may be selected for any portions of a scene, including complex textures and patterns, that can later be corrected using less computationally intensive post rendering denoising techniques. FIG. 4 illustrates an embodiment of the rendered scene after denoising using the specified technique. As depicted, the final rendering comprises a high quality or resolution image despite the reduced sampling during ray tracing.

Figure 5:
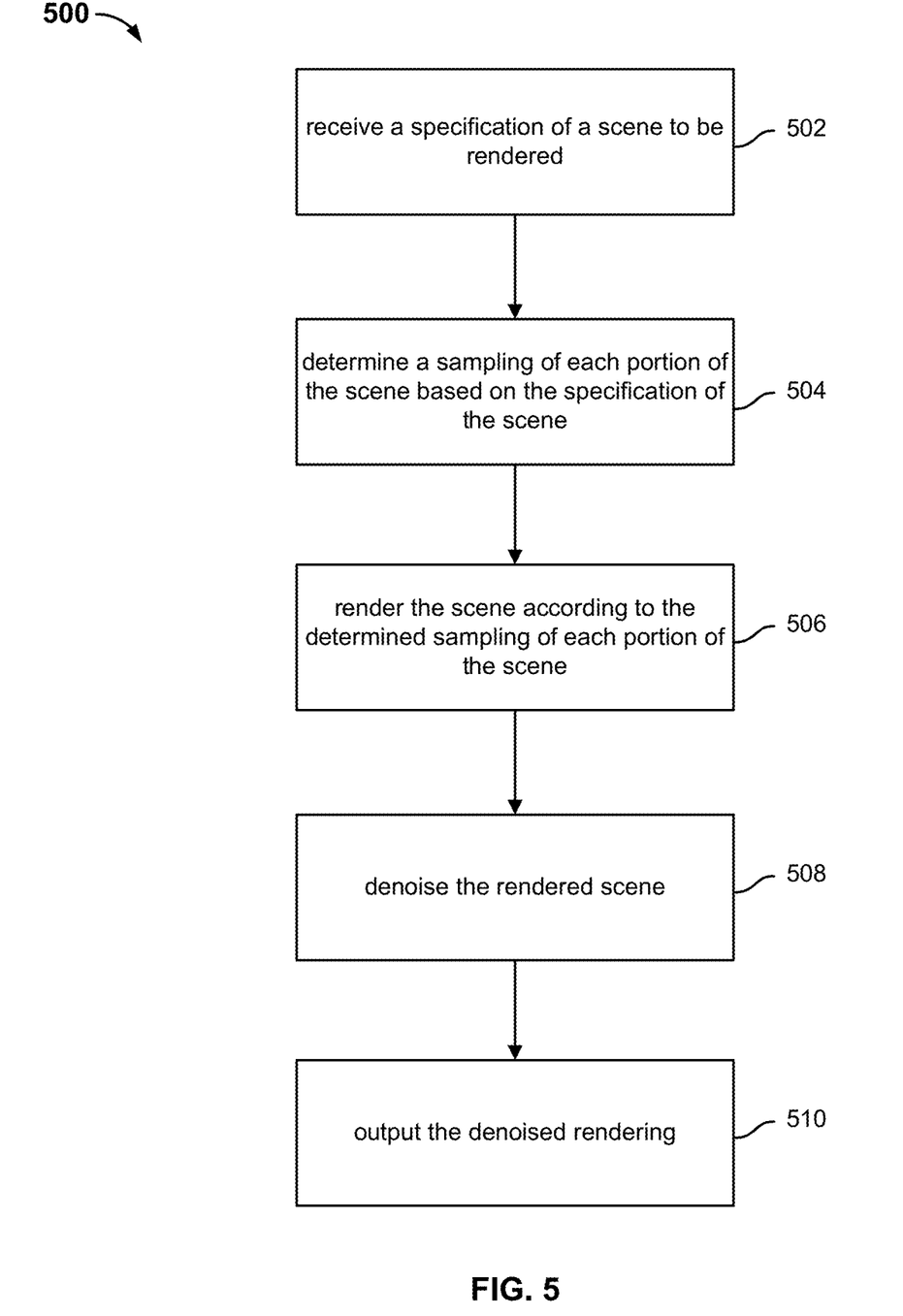
FIG. 5 illustrates an embodiment of a process for rendering a scene based on adaptive sampling.

FIG. 5 illustrates an embodiment of a process for rendering a scene based on adaptive sampling. The rendering of the scene may comprise a still image or a frame of a video sequence. Generally, process 500 may be performed by a virtual camera having an adaptive sensor customized based on a scene to be rendered. In various embodiments, process 500 may be performed by a processor coupled to a memory that provides instructions to the processor or a computer program product.

Process 500 starts at step 502 at which a specification of a scene to be rendered is received. For example, the scene to be rendered may comprise a view of a three-dimensional virtual environment from a particular position and/or angle. The specification of the scene received at step 502 may comprise information about the scene such as scene content, objects, geometry, lighting, environment, textures, etc. The specification of the scene received at step 502 may further comprise a virtual camera position from which the scene is viewed.

At step 504, a sampling of each portion of the scene is determined based at least in part on the specification of the scene received at step 502. More specifically, samplings of pixels of an image plane of a virtual camera viewing the scene from a particular position are determined at step 504 based on the portions of the scene seen or covered by the pixels. In some embodiments, step 504 includes a first intersection calculation via which rays are cast from the pixels into the scene to determine the portions of the scene covered by each pixel so that samplings of the pixels can be determined based on the portions of the scene covered by each pixel. Generally, different samplings are selected for different portions of the scene based on the scene composition and elements of the scene covered by each portion. That is, the scene is not uniformly sampled. Furthermore, in many cases, fewer samples than needed to obtain converging pixel values are selected. Higher sampling rates are selected for portions of a scene that are complex, rapidly spatially varying, and/or unknown. Lower sampling rates are selected for portions of a scene that are known to be amenable to post rendering denoising techniques.

In some embodiments, step 504 comprises determining a number of samples of rays for ray tracing each portion of the scene. In some embodiments, step 504 comprises determining portions or areas of the scene to sample equivalently, i.e., with the same number of samples of rays during ray tracing. In various embodiments, the sampling of each portion of the scene determined at step 504 may be based at least in part on a complexity of that portion and/or on an ability to denoise that portion post rendering. Specifically, each portion of the scene corresponds to one or more pixels of an image plane of a virtual camera configured to render the scene. In the cases in which each pixel of the image plane comprises the same area, the sampling of each pixel comprises an adaptively determined number of samples of rays for ray tracing that pixel based on a view of the scene from that pixel. In the cases in which each pixel of the image plane is sampled using a same number of rays for ray tracing, the sampling of each pixel comprises an adaptively determined area of that pixel based on a view of the scene from that pixel.

At step 506, the scene is rendered according to the determined sampling of each portion of the scene. That is, step 506 comprises ray tracing the scene according to the determined sampling of each portion. At step 508, a rendering of the scene is denoised. That is, a ray traced rendering of the scene is denoised based on foreknowledge of the scene. One or more relevant texture dictionaries or libraries may be employed at step 508 to denoise the scene. At step 510, the denoised rendering is output, e.g., as a file or via a display. Process 500 subsequently ends.

The described techniques for intelligently sampling during ray tracing in many cases result in significantly reducing the processing resources needed and latency introduced during rendering. Moreover, the described techniques may be employed to optimally sample according to a desired sampling budget and/or render time budget.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
receiving a specification of a scene to render;
determining for each of one or more pixels of an image of the scene a sampling associated with that pixel, wherein the determined sampling of that pixel is based on foreknowledge of a texture comprising that pixel and an ability to denoise that pixel post rendering using a corresponding texture definition that is available for denoising that texture, wherein denoising that texture post rendering comprises reconstructing that texture after the image has been rendered using a combination of a subset of texture images comprising the texture definition of that texture; and
rendering the image of the scene according to the determined sampling.

2. The method of claim 1, wherein at least a subset of pixels of the image of the scene is sampled with fewer samples than needed to obtain pixel convergence.

3. The method of claim 2, wherein sampling with fewer samples than needed for pixel convergence is corrected using less computationally intensive post rendering denoising techniques.

4. The method of claim 2, wherein the at least subset of pixels comprises complex textures or patterns in the scene.

5. The method of claim 2, wherein the at least subset of pixels is denoised post rendering using one or more corresponding texture dictionaries or libraries.

6. The method of claim 1, wherein the method is employed by a virtual camera having a sensor that is adapted based on the specification of the scene.

7. The method of claim 1, wherein pixels of the image of the scene are not uniformly sampled.

8. The method of claim 1, wherein pixels of the image of the scene have a same area.

9. The method of claim 1, wherein pixels of the image of the scene are sampled with different numbers of samples.

10. The method of claim 1, wherein pixels of the image of the scene are not equally sized.

11. The method of claim 1, wherein pixels of the image of the scene are sampled with a same number of samples.

12. The method of claim 1, wherein a size of each pixel comprises an adaptively determined area.

13. The method of claim 1, further comprising denoising the rendered image of the scene.

14. The method of claim 13, wherein foreknowledge of the scene and one or more texture dictionaries or libraries are employed to denoise the rendered image.

15. The method of claim 13, further comprising outputting the denoised rendered image of the scene.

16. The method of claim 1, wherein pixel sampling corresponds to numbers of samples of rays for ray or path tracing.

17. The method of claim 1, wherein pixel sampling corresponds to pixel areas.

18. The method of claim 1, wherein higher sampling rates are selected for pixels that cover portions of the scene that are complex or unknown and lower sampling rates are selected for pixels that cover portions of the scene that are amenable to post rendering denoising techniques.

19. A system, comprising:
a processor configured to:
receive a specification of a scene to render;
determine for each of one or more pixels of an image of the scene a sampling associated with that pixel, wherein the determined sampling of that pixel is based on foreknowledge of a texture comprising that pixel and an ability to denoise that pixel post rendering using a corresponding texture definition that is available for denoising that texture, wherein denoising that texture post rendering comprises reconstructing that texture after the image has been rendered using a combination of a subset of texture images comprising the texture definition of that texture; and
render the image of the scene according to the determined sampling; and a memory coupled to the processor and configured to provide the processor with instructions.

20. A computer program product embodied in a non-transitory computer readable medium and comprising computer instructions for:

receiving a specification of a scene to render;

determining for each of one or more pixels of an image of the scene a sampling associated with that pixel, wherein the determined sampling of that pixel is based on foreknowledge of a texture comprising that pixel and an ability to denoise that pixel post rendering using a corresponding texture definition that is available for denoising that texture, wherein denoising that texture post rendering comprises reconstructing that texture after the image has been rendered using a combination of a subset of texture images comprising the texture definition of that texture; and rendering the image of the scene according to the determined sampling.

21. The system of claim 19, wherein at least a subset of pixels of the image of the scene is sampled with fewer samples than needed to obtain pixel convergence.

22. The system of claim 21, wherein sampling with fewer samples than needed for pixel convergence is corrected using less computationally intensive post rendering denoising techniques.

23. The system of claim 21, wherein the at least subset of pixels comprises complex textures or patterns in the scene.

24. The system of claim 21, wherein the at least subset of pixels is denoised post rendering using one or more corresponding texture dictionaries or libraries.

25. The system of claim 19, wherein the system is employed by a virtual camera having a sensor that is adapted based on the specification of the scene.

26. The system of claim 19, wherein pixels of the image of the scene are not uniformly sampled.

27. The system of claim 19, wherein pixels of the image of the scene have a same area.

28. The system of claim 19, wherein pixels of the image of the scene are sampled with different numbers of samples.

29. The system of claim 19, wherein pixels of the image of the scene are not equally sized.

30. The system of claim 19, wherein pixels of the image of the scene are sampled with a same number of samples.

31. The system of claim 19, wherein a size of each pixel comprises an adaptively determined area.

32. The system of claim 19, wherein the processor is further configured to denoise the rendered image of the scene.

33. The system of claim 32, wherein foreknowledge of the scene and one or more texture dictionaries or libraries are employed to denoise the rendered image.

34. The system of claim 32, wherein the processor is further configured to output the denoised rendered image of the scene.

35. The system of claim 19, wherein pixel sampling corresponds to numbers of samples of rays for ray or path tracing.

36. The system of claim 19, wherein pixel sampling corresponds to pixel areas.

37. The system of claim 19, wherein higher sampling rates are selected for pixels that cover portions of the scene that are complex or unknown and lower sampling rates are selected for pixels that cover portions of the scene that are amenable to post rendering denoising techniques.

38. The computer program product of claim 20, wherein at least a subset of pixels of the image of the scene is sampled with fewer samples than needed to obtain pixel convergence.

39. The computer program product of claim 38, wherein sampling with fewer samples than needed for pixel convergence is corrected using less computationally intensive post rendering denoising techniques.

40. The computer program product of claim 38, wherein the at least subset of pixels comprises complex textures or patterns in the scene.

41. The computer program product of claim 38, wherein the at least subset of pixels is denoised post rendering using one or more corresponding texture dictionaries or libraries.

42. The computer program product of claim 20, wherein the computer program product is employed by a virtual camera having a sensor that is adapted based on the specification of the scene.

43. The computer program product of claim 20, wherein pixels of the image of the scene are not uniformly sampled.

44. The computer program product of claim 20, wherein pixels of the image of the scene have a same area.

45. The computer program product of claim 20, wherein pixels of the image of the scene are sampled with different numbers of samples.

46. The computer program product of claim 20, wherein pixels of the image of the scene are not equally sized.

47. The computer program product of claim 20, wherein pixels of the image of the scene are sampled with a same number of samples.

48. The computer program product of claim 20, wherein a size of each pixel comprises an adaptively determined area.

49. The computer program product of claim 20, further comprising computer instructions for denoising the rendered image of the scene.

50. The computer program product of claim 49, wherein foreknowledge of the scene and one or more texture dictionaries or libraries are employed to denoise the rendered image.

51. The computer program product of claim 49, further comprising computer instructions for outputting the denoised rendered image of the scene.

52. The computer program product of claim 20, wherein pixel sampling corresponds to numbers of samples of rays for ray or path tracing.

53. The computer program product of claim 20, wherein pixel sampling corresponds to pixel areas.

54. The computer program product of claim 20, wherein higher sampling rates are selected for pixels that cover portions of the scene that are complex or unknown and lower sampling rates are selected for pixels that cover portions of the scene that are amenable to post rendering denoising techniques.

* * * * *